United States Patent
Kim et al.

(10) Patent No.: US 12,545,528 B2
(45) Date of Patent: Feb. 10, 2026

(54) SYSTEM AND METHOD FOR SUPPLYING PARTS FOR VEHICLE MANUFACTURING PROCESS

(71) Applicants: Hyundai Motor Company, Seoul (KR); Kia Corporation, Seoul (KR); CMES Inc., Daejeon (KR)

(72) Inventors: Beom-Chul Kim, Gyeonggi-do (KR); Myoung-Jin Seo, Seoul (KR); Jae-Seol Lee, Seoul (KR); Sung-Ho Lee, Seoul (KR); Sang-Yong Park, Gyeonggi-do (KR)

(73) Assignees: Hyundai Motor Company, Seoul (KR); Kia Corporation, Seoul (KR); CMES Inc., Daejeon (KR)

( * ) Notice: Subject to any disclaimer, the term of this patent is extended or adjusted under 35 U.S.C. 154(b) by 288 days.

(21) Appl. No.: 18/208,573

(22) Filed: Jun. 12, 2023

(65) Prior Publication Data
US 2024/0270512 A1    Aug. 15, 2024

(30) Foreign Application Priority Data
Feb. 15, 2023    (KR) .................. 10-2023-0019764

(51) Int. Cl.
*B65G 47/90* (2006.01)
*B62D 65/02* (2006.01)
*B62D 65/18* (2006.01)

(52) U.S. Cl.
CPC ......... *B65G 47/905* (2013.01); *B62D 65/026* (2013.01); *B62D 65/18* (2013.01)

(58) Field of Classification Search
CPC .... B65G 47/905; B62D 65/026; B62D 65/18; B62D 65/022; B62D 65/028; B25J 9/1664; B25J 9/1697; B25J 11/005; B25J 13/08; B25J 19/02
USPC ...................................................... 700/246
See application file for complete search history.

(56) References Cited

U.S. PATENT DOCUMENTS

| | | | |
|---|---|---|---|
| 2015/0336271 A1* | 11/2015 | Spicer | B25J 9/1687 228/9 |
| 2018/0173208 A1* | 6/2018 | Lee | G05B 19/4189 |
| 2020/0134860 A1* | 4/2020 | Haven | G06T 7/0004 |
| 2020/0147738 A1* | 5/2020 | Tanio | B23Q 7/048 |
| 2021/0032030 A1 | 2/2021 | Kalouche | |

(Continued)

FOREIGN PATENT DOCUMENTS

| | | |
|---|---|---|
| KR | 10-2019-0124367 A | 11/2019 |
| KR | 10-2205486 B1 | 1/2021 |

(Continued)

*Primary Examiner* — Kira Nguyen
(74) *Attorney, Agent, or Firm* — Fox Rothschild LLP (57) ABSTRACT

A system and method are configured to supply parts for use in a vehicle manufacturing process. The vehicle parts supply system includes a parts loading device in which a plurality of parts is loaded, a scanning device configured to scan the plurality of parts loaded in the parts loading device, a controller configured to select one or more parts having a specification suitable for a manufacturing target vehicle among the plurality of parts loaded in the parts loading device from a scanned image by the scanning device, and a pick and place device configured to move and align the parts selected by the controller from the parts loading device to a parts alignment device.

19 Claims, 9 Drawing Sheets

(56) References Cited

U.S. PATENT DOCUMENTS

| | | | |
|---|---|---|---|
| 2021/0042665 A1 | 2/2021 | Ghanem et al. | |
| 2021/0284261 A1* | 9/2021 | Nguyen | B62D 65/022 |
| 2022/0024041 A1* | 1/2022 | Freire | B25J 9/1664 |

FOREIGN PATENT DOCUMENTS

| | | |
|---|---|---|
| KR | 10-2021-0070505 A | 6/2021 |
| KR | 10-2022-0035493 A | 3/2022 |
| KR | 10-2022-0042848 A | 4/2022 |

* cited by examiner

SYSTEM AND METHOD FOR SUPPLYING PARTS FOR VEHICLE MANUFACTURING PROCESS

CROSS-REFERENCE(S) TO RELATED APPLICATIONS

This application claims under 35 U.S.C. § 119(a) the benefit of Korean Patent Application No. 10-2023-0019764, filed on Feb. 15, 2023, the entire contents of which are incorporated herein by reference.

BACKGROUND

(a) Technical Field

Exemplary embodiments of the present disclosure relate to a system and a method for supplying parts used in a vehicle manufacturing process.

(b) Description of the Related Art

In a vehicle manufacturing process, parts for assembly need to be assembled in the right place according to a corresponding vehicle type.

For example, there are plugs for closing holes formed in a manufactured vehicle body, and a process of manually attaching the plugs to a plurality of holes in the vehicle body and closing the plurality of holes is required.

Since parts specifications are designed to optimize conditions of noise and vibration in vehicle development, accurate parts suitable for the vehicle type must be applied.

In a loading container in which a plurality of parts is stored, various parts with different specifications according to the vehicle type are loaded even when the parts have the same characteristics. Typically, a worker manually selects certain parts suitable for a corresponding vehicle from the loading container so as to close holes in the vehicle body.

In conjunction with the above manual selection process, the worker typically sorts the same parts one by one and selects a plurality of suitable parts. To this end, a number of musculoskeletal disorders may occur in workers due to bending over, and a significant time and personnel are required to install the plurality of parts.

The contents described in the above descriptions are to aid understanding of the background of the present disclosure and may include what is not previously known to those skilled in the art to which the present disclosure pertains.

SUMMARY

An embodiment of the present disclosure is directed to a system and method of providing vehicle parts for a vehicle manufacturing system and process, which enable the accurate selection of parts suitable for a vehicle while reducing the number of personnel and time for parts installation.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a vehicle parts supply system including a parts loading device in which a plurality of parts is loaded, a scanning device configured to scan the plurality of parts loaded in the parts loading device, a controller configured to select one or more parts having a specification suitable for a manufacturing target vehicle among the plurality of parts loaded in the parts loading device from a scanned image by the scanning device, and a pick and place device configured to move and align the parts selected by the controller from the parts loading device to a parts alignment device.

In addition, the controller may select one or more parts meeting a specification suitable for the manufacturing target vehicle through deep learning of the scanned image.

In addition, the controller may select one or more parts having a specification suitable for a position where the parts is coupled to the manufacturing target vehicle.

In addition, the controller may generate path information for picking one or more parts selected according to priority among the plurality of parts having specifications suitable for the manufacturing target vehicle and control an operation of the pick and place device according to the path information.

In addition, the controller may select the parts according to the priority, and the controller may select a target having the smallest angle between one surface of the parts and a bottom surface of the loading device.

Meanwhile, the parts loading device may include a loading container, a plate which divides an internal space of the loading container into an upper space and a lower space and in which a plurality of holes are formed, and a plurality of pins disposed in the lower space divided by the plate and configured to be raised by a pin driver, and perform a protruding operation into the upper space through the plurality of holes.

In addition, the controller may control the plurality of the pins to perform the protruding operation into the upper space by the pin driver, thereby aligning the parts loaded in the upper space.

In addition, the parts alignment device may include an alignment jig, a plurality of seating parts which are formed on the alignment jig and on which the plurality of parts are seated, a plurality of home position sensors configured to detect whether the plurality of parts are seated in home positions of each of the plurality of seating parts, and a plurality of home position adjustment parts configured to align a plurality of parts that are not seated in the home positions of each of the plurality of seating parts, to the home positions.

Here, the alignment jig may be disposed to be inclined with respect to the ground.

In addition, the plurality of home position adjustment parts may be disposed in an upper direction of the plurality of seating parts and may be operated in a vertical direction of the alignment jig under control of the controller.

In accordance with another embodiment of the present disclosure, there is provided a method of supplying vehicle parts, which includes receiving, by a controller, specifications of a plurality of parts suitable for a manufacturing target vehicle, scanning, by a scanning device, a parts loading device loaded with the plurality of parts under control of a controller, deep learning, by the controller, a scanned image of the scanning operation and identifying a plurality of parts having specifications suitable for the manufacturing target vehicle among the plurality of parts loaded in the parts loading device, selecting one or more parts among the plurality of parts having the specifications suitable for the manufacturing target vehicle and generating path information for picking the selected parts, and controlling, by the controller, an operation of a pick and place device according to the path information and moving and aligning, by the pick and place device, the selected parts from the parts loading device to a parts alignment device.

In addition, in the generating of the path information, the controller may select a target having the smallest angle between one surface of the parts and a bottom surface of the loading device.

In addition, the parts loading device may include a loading container, a plate which divides an internal space of the loading container into an upper space and a lower space and in which a plurality of holes are formed, and a plurality of pins disposed in the lower space divided by the plate and configured to be raised by a pin driver and perform a protruding operation into the upper space through the plurality of holes, and the method may further include, when the plurality of parts having specifications suitable for the manufacturing target vehicle are not identified in the identifying operation, controlling the pin driver to perform a protruding operation of the plurality of pins into the upper space and aligning the plurality of parts loaded in the upper space.

In addition, the method may further include, after the generating of the path information, apart from the aligning operation, checking whether the number of the plurality of parts identified in the identifying of the plurality of parts having the specifications suitable for the manufacturing target vehicle satisfies the number of the plurality of parts of scanning completion determined in the receiving of the specifications of the plurality of parts, and when the number of the plurality of parts of scanning completion is not satisfied, the receiving of the specifications of the plurality of parts may be re-performed.

In addition, the method may further include, after the aligning operation, checking whether the number of parts of work completion in the aligning operation satisfies the number of the plurality of parts of work completion determined in the receiving of the specifications of the plurality of parts, and when the number of the plurality of parts of work completion is not satisfied, the aligning operation may be re-performed.

In addition, the parts alignment device may include an alignment jig, a plurality of seating parts which are formed on the alignment jig and on which the plurality of parts are seated, a plurality of home position sensors configured to detect whether the plurality of parts are seated in home positions of each of the plurality of seating parts, and a plurality of home position adjustment parts configured to align a plurality of parts that are not seated in the home positions of each of the plurality of seating parts, to the home positions, and the method may further include, when the number of the plurality of parts of work completion is satisfied as a result of the checking of whether the number of the plurality of parts of work completion is satisfied, controlling an operation of the plurality of home position adjustment parts and seating the plurality of parts seated on the plurality of seating parts in home positions.

In addition, the method may further include, after the seating of the plurality of parts in the home positions, checking, by the plurality of home position sensors, whether the number of a plurality of parts satisfying the number of the plurality of parts of work completion is recognized, and when the number of the plurality of parts satisfying the number of the plurality of parts of work completion is not recognized, the method may re-perform the receiving of the specifications of the plurality of parts.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

As used herein, the term "transfer device" generally refers to a device used to transfer or move one or more parts from one location to another, typically using automation. A pick and place device is a specific type of transfer device that typically incorporates a robotic arm, and may use vacuum or suction to lift a part and move it to another location.

In order to fully understand the present disclosure and operational advantages of the present disclosure and objects attained by practicing the present disclosure, reference should be made to the accompanying drawings that illustrate exemplary embodiments of the present disclosure and to the description in the accompanying drawings.

In describing exemplary embodiments of the present disclosure, known technologies or repeated descriptions may be reduced or omitted to avoid unnecessarily obscuring the gist of the present disclosure.

Figure 1:
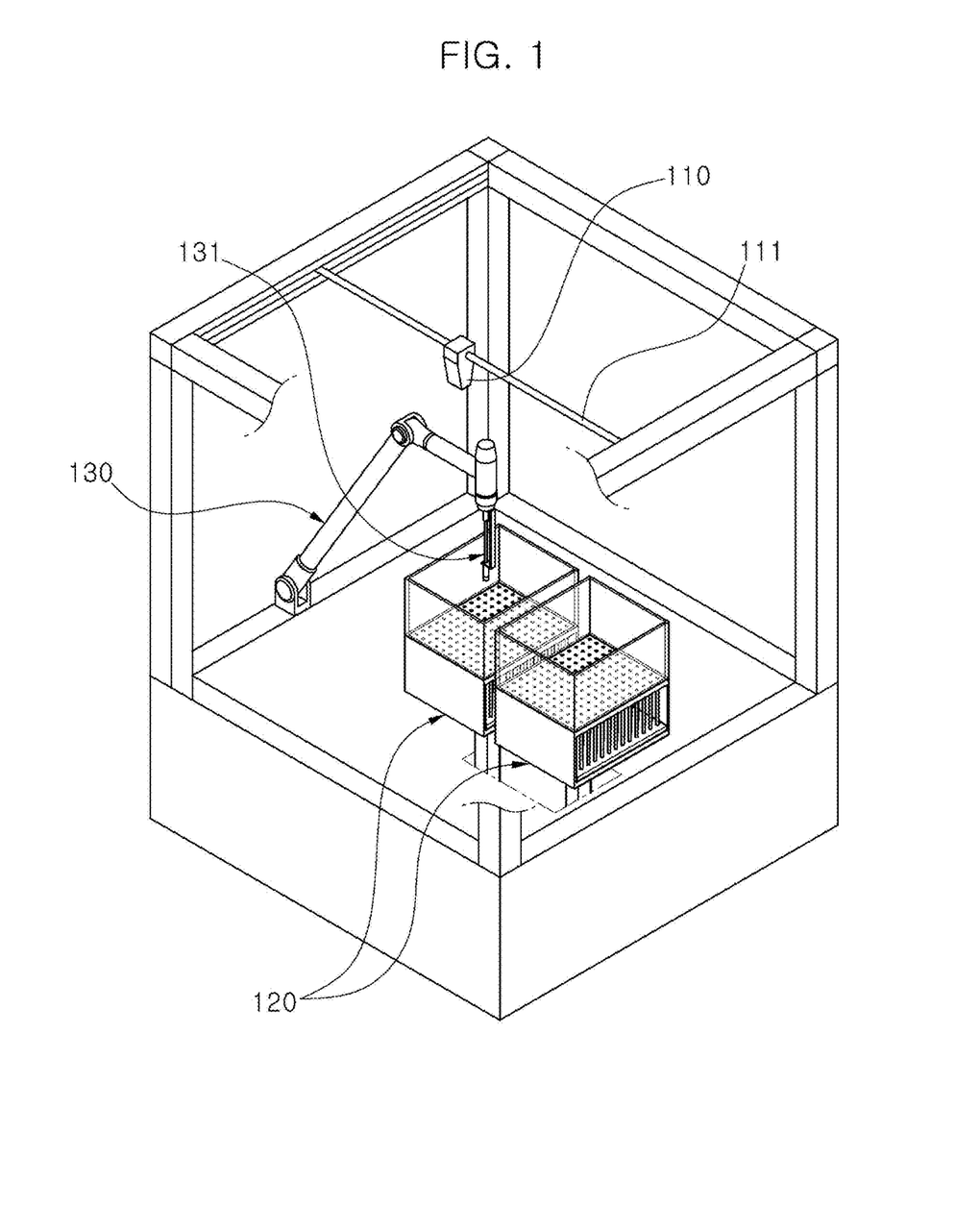
FIG. 1 is a schematic diagram illustrating a vehicle parts supply system according to the present disclosure.

FIG. 1 is a schematic diagram illustrating a vehicle parts supply system according to the present disclosure.

Hereinafter, the vehicle parts supply system according to the present disclosure will be described with reference to FIG. 1.

The present disclosure relates to a system for selecting and picking required parts from a loading device and automatically supplying the required parts to a worker during a vehicle manufacturing process.

The system includes a part loading device 120 in which one or more parts is loaded, a scanning device 110 for scanning the parts in the parts loading device 120, a transfer device (e.g., a pick and place device) 130 for moving the selected parts from the parts loading device 120 to a parts alignment device and aligning the moved parts, and a controller for selecting required parts according to a vehicle type from scanning information on the basis of pre-learned data and operating and controlling the pick and place device 130.

The parts loading device 120 may be provided as a plurality of parts loading devices, and a detailed configuration thereof will be described below.

The parts loaded in the parts loading device 120 may be of various types, and even the same type of parts may be loaded therein. In the case of the same type of parts, the parts loading device 120 selects parts having specifications suitable for a vehicle type from parts having different specifications among the same type of parts.

In an example of the present disclosure, a plug P for closing a hole formed in a vehicle body will be described as an example.

The scanning device 110 may be a tree-dimensional (3D) vision device and is moved in position by a stage 111 for operating the scanning device 110 in a three-axis direction to scan the parts loading device 120 using a laser.

The pick and place device 130 may be a so-called bin picking robot and is a device capable of a multi-axis operation such as seven-axis operation. A rotating-type gripper 131 is installed in the pick and place device 130 and picks the parts in the parts loading device 120.

The controller of the present disclosure stores parts data on specifications corresponding to a vehicle type and a parts coupling position and may select parts of required specifications by scanning the parts coupling position (a hole of the vehicle body).

In addition, the controller stores information on drawings including outer shapes of parts and may obtain position information on corresponding parts in the parts loading device 120 through a scanned image by the scanning device 110.

Then, the controller may generate path information for picking one or more parts selected according to priority among the corresponding parts, control an operation of the pick and place device 130 according to corresponding path information, and control the pick and place device 130 to pick and align the selected parts in the parts alignment device, thereby allowing the parts to be supplied.

Figure 2:
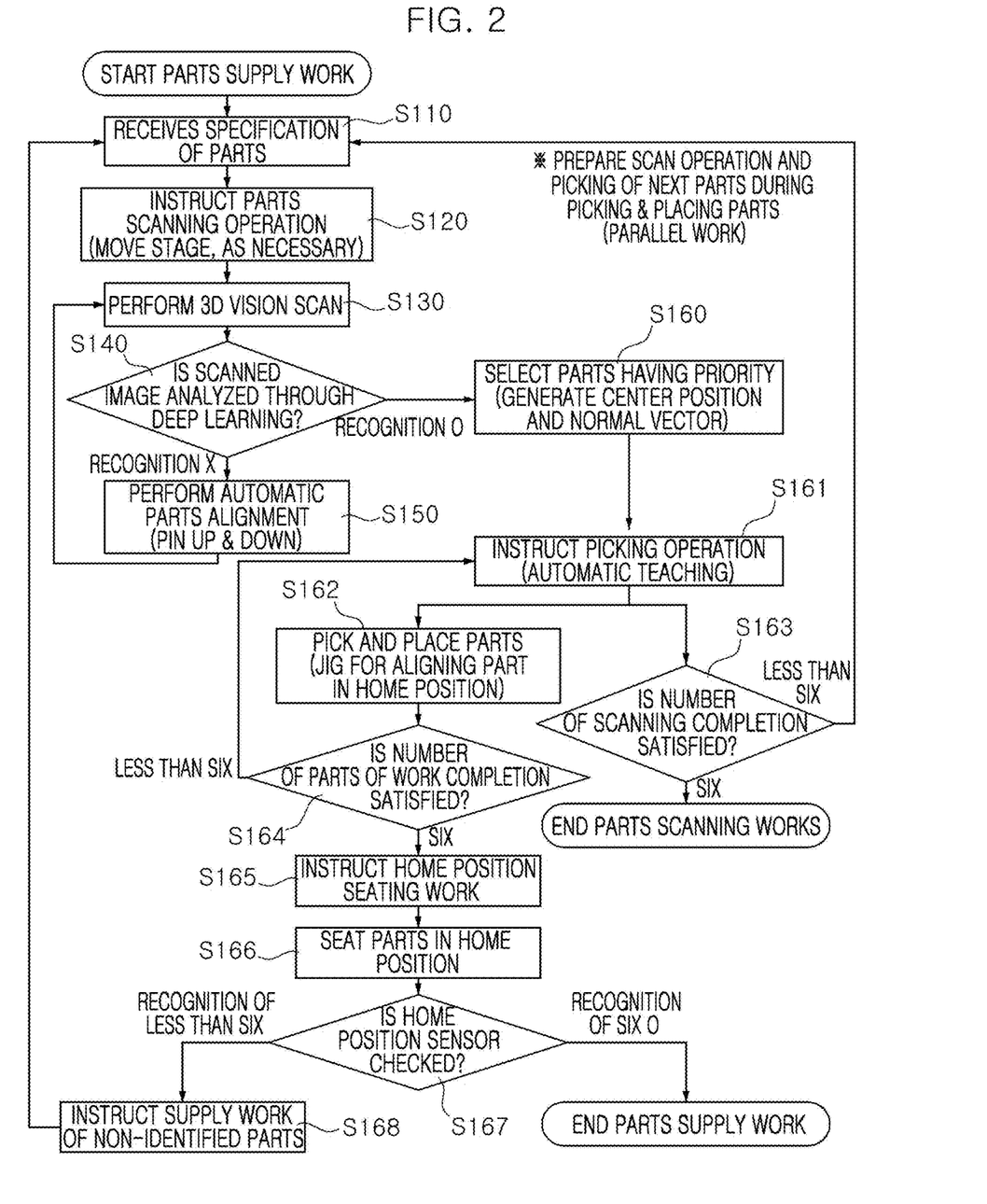
FIG. 2 is a diagram illustrating a method of supplying vehicle parts according to the present disclosure.

Next, with reference to FIG. 2, a method of supplying vehicle parts according to the present disclosure and a detailed configuration of the vehicle parts supply system according to the present disclosure will be described.

When a parts supply operation starts and the controller receives specifications of parts (S110), the scanning device 110 is instructed to perform a parts scanning operation (S120).

In this case, when movement to the parts loading device is required, the stage 111 is controlled to move the scanning device 110 to a position where scanning of the parts is possible so that one or more parts is scanned by the scanning device 110 (3D vision) (S130).

Figure 3:
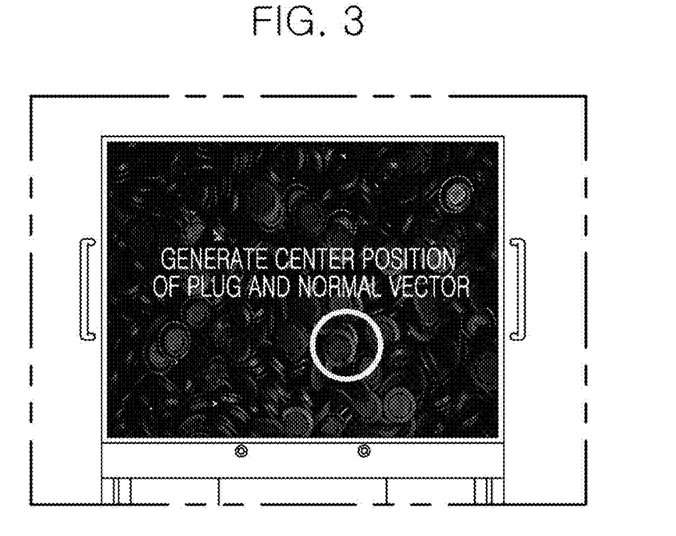
FIG. 3 is a diagram illustrating an example of a parts image obtained by the vehicle parts supply system according to the present disclosure.

As shown in FIG. 3, the controller acquires a scanned image obtained by scanning the parts loading container, analyzes the scanned image through a deep learning algorithm such as convolution neural network (CNN), and identifies parts meeting specifications received in S110 (S140).

In this case, as a result of the image analysis, when there is no part meeting the specifications, automatic parts alignment is performed (S150).

Figure 4:
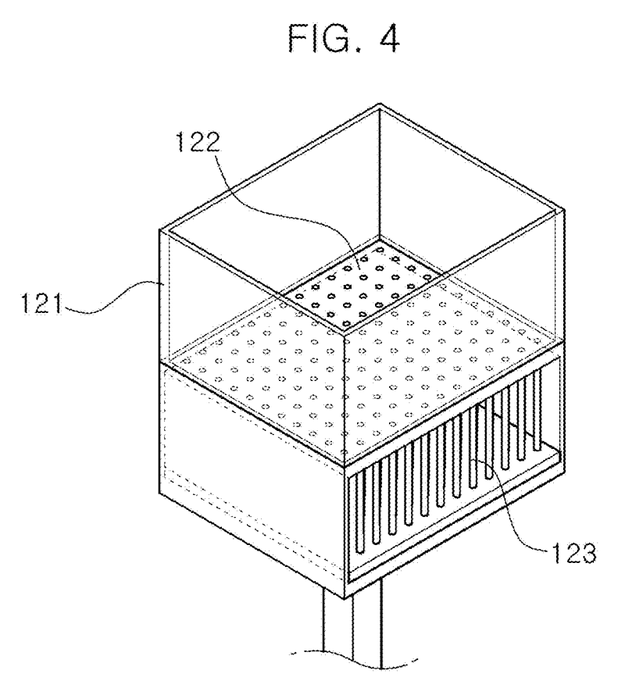
FIGS. 4 and 5 are diagrams illustrating an operating state of a parts loading device of the vehicle parts supply system according to the present disclosure.
Figure 5:
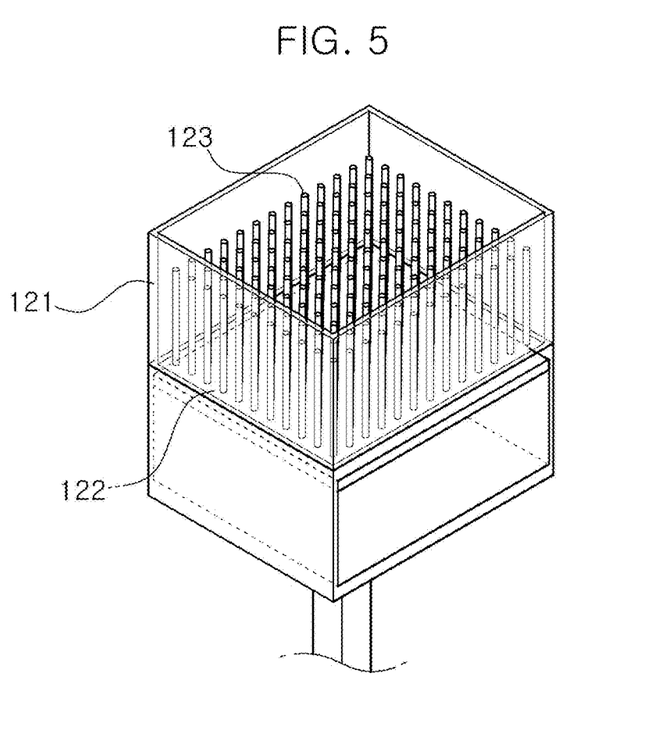

The automatic parts alignment is performed according to a process shown in FIGS. 4 and 5.

The parts loading device includes a loading container 121, and a plate 122 for dividing an upper space and a lower space is formed in the loading container 121, and thus one or more parts is loaded in the upper space divided by the plate 122. The loading container 121 may be provided as a plurality of loading containers.

Here, holes are formed in the plate 122, and a plurality of pins 123 disposed in the lower space as shown in FIG. 4 are raised by a pin driver as shown in FIG. 5 and are operated to protrude into the upper space through the holes.

The parts in the loading container 121 are rearranged by the pin up-down method, and loading containers required to be aligned among a plurality of loading containers are rearranged.

Otherwise, as the analysis result in S140, when parts meeting the specifications are recognized, a part having priority is selected (S160).

A target having the smallest angle (closest to zero degree) between a bottom surface of the loading container 121 and one surfaces of parts or a top surface in the case of the plug P is selected as the parts having priority.

As shown in FIG. 3, a normal vector is generated with respect to a center position of the selected plug.

As described above, when the part having priority is selected, the controller instructs the pick and place device 130 to pick the selected part (S161).

That is, a center position of the part having priority is converted into a robot coordinate system, path information for picking the part having priority is generated (automatic teaching), and the pick and place device 130 is controlled by the generated path information to pick the parts and then place the picked parts on the parts alignment device (S162).

Figure 6:
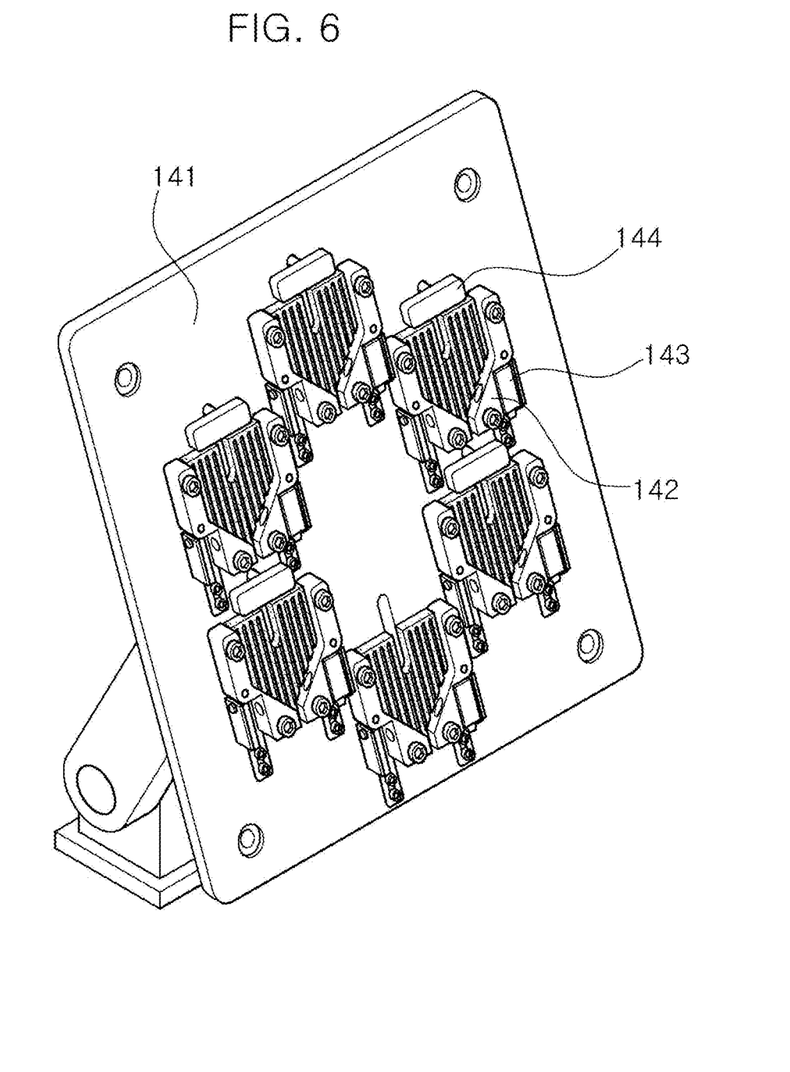
FIG. 6 is a diagram illustrating a parts alignment device of the vehicle parts supply system according to the present disclosure.
Figure 7:
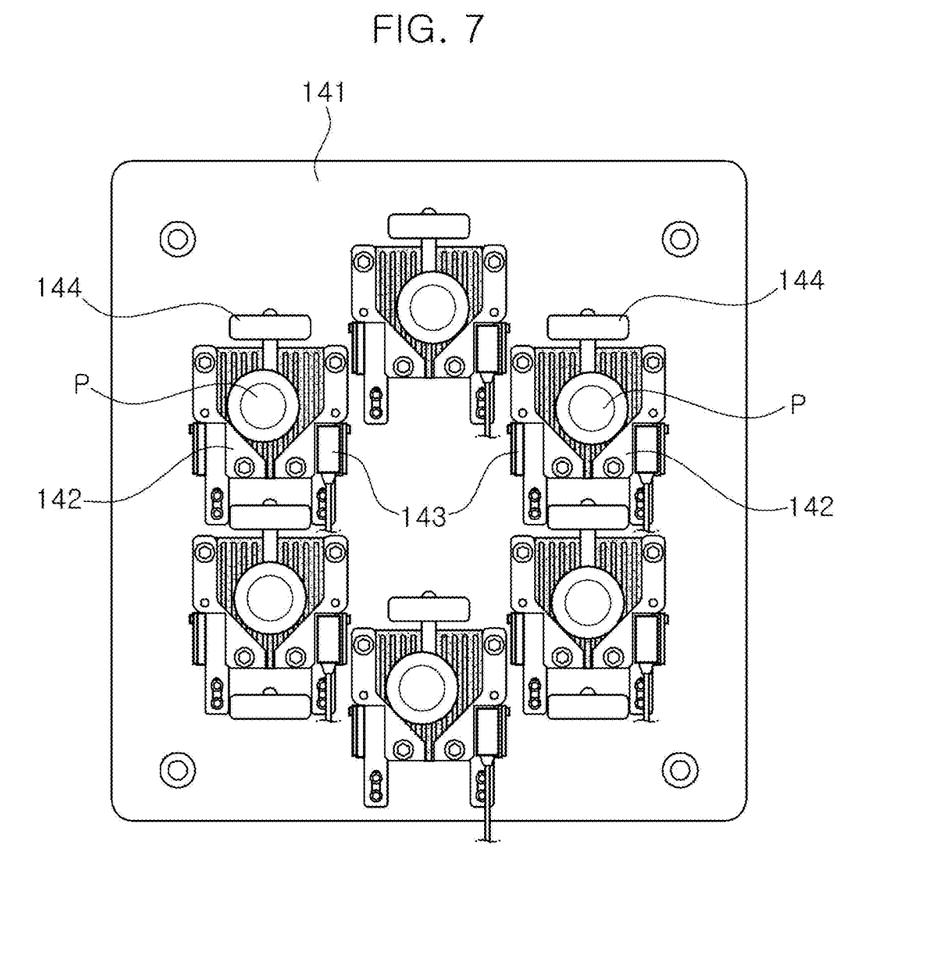
FIGS. 7 to 9 are diagrams illustrating an operating state of the parts alignment device of the vehicle parts supply system according to the present disclosure.
Figure 8:
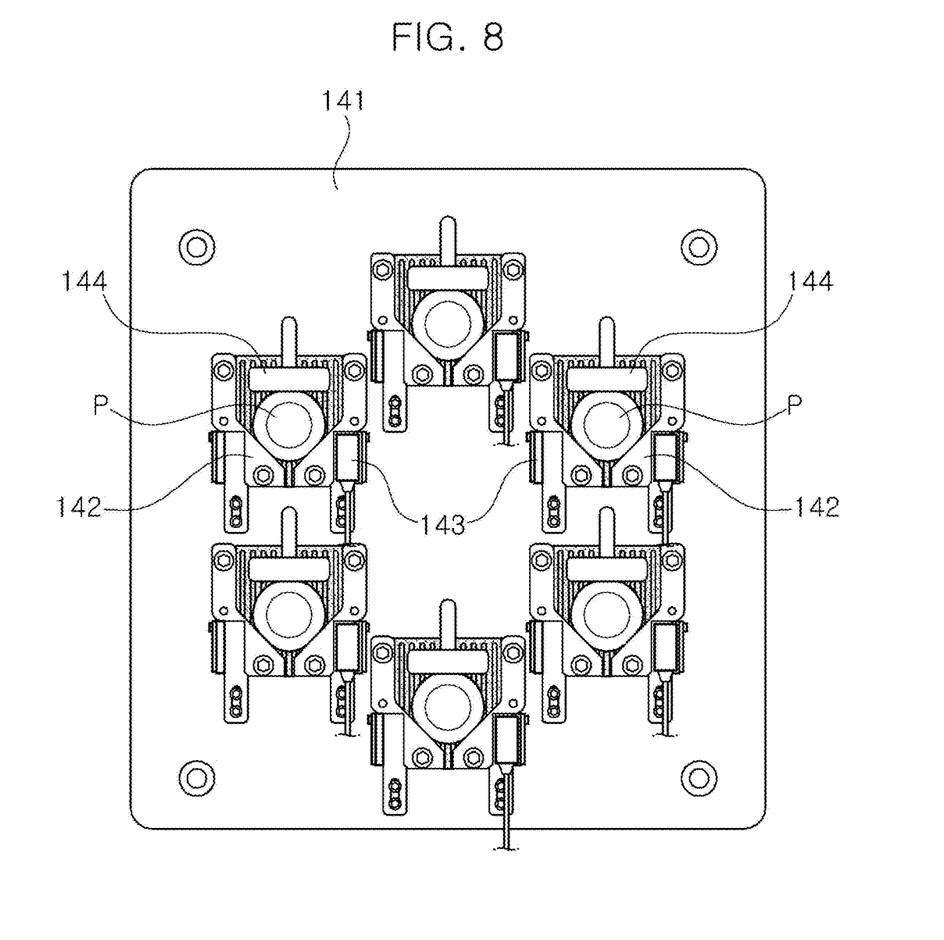
Figure 9:
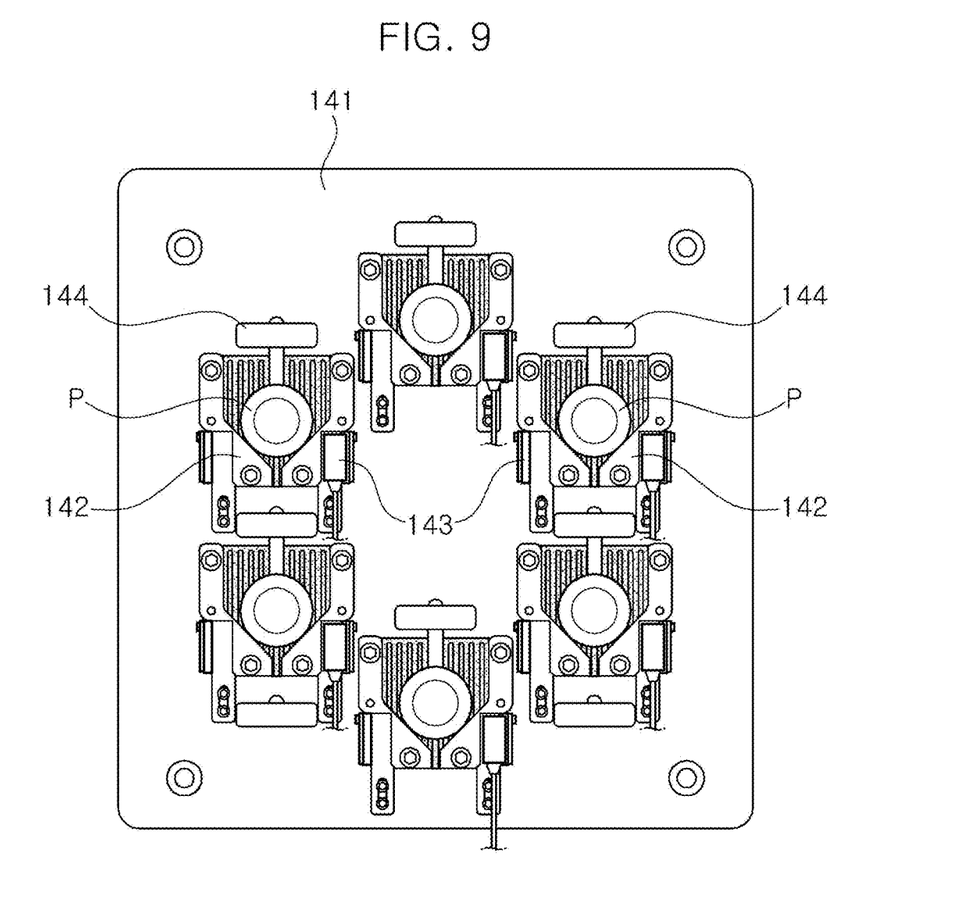

FIG. 6 is a diagram illustrating a parts alignment device of the vehicle parts supply system according to the present disclosure, and FIGS. 7 to 9 are diagrams illustrating an operating state of the parts alignment device of the vehicle parts supply system according to the present disclosure.

The parts alignment device includes a seating part 142 on which a part is seated and which is formed on an alignment jig 141, a home position sensor 143 for detecting whether a position of the parts seated on the seating part 142 is properly seated in a home position, and a home position adjustment part 144 for aligning the parts in the seating part 142 when the parts is not properly seated in the home position.

The alignment jig 141 may be disposed to be inclined with respect to the ground in order to facilitate placement of the parts.

A plurality of seating parts 142 are disposed on the alignment jig 141 so that a plurality of parts required for a vehicle may be seated. In the example, six seating parts 142 are configured.

The home position sensor 143 is disposed to correspond to each seating part 142, and when one or more parts is not properly seated in a corresponding seating part 142, the controller controls an operation of the home position adjustment part 144 to correctly install the parts.

That is, the home position adjustment part 144 is disposed in an upward direction of the seating part 142 and is configured to operate in a vertical direction of the alignment jig 141. The operation of the home position adjustment part 144 is controlled so that the home position adjustment part 144 moves downward in an alignment state of the plug P as shown in FIG. 7, and thus the plug P is brought into close contact with the seating part 142 as shown in FIG. 8.

Then, the home position adjustment part 144 moves upward to be positioned at the original position, and the plug P is seated in the home position of the seating part 142.

In this way, after the parts are picked and placed in S162, it is checked whether the number of parts required for work completion is satisfied (S164). That is, according to the present disclosure, the number of parts required for work completion is received according to the required quantity of parts as well as the parts specification in S110, and the picking and placing of the parts may be performed by S161 and S162 until the number of parts required for work completion is satisfied.

For example, six parts are illustrated. The number of parts (i.e., in this example, six parts) is not limiting, and any number of parts may be used depending on the particular manufacturing process.

Meanwhile, while the picking and placing of the parts is performed in S162, it is checked whether the number of parts being scanned is satisfied (S163).

That is, in order to supply as many parts as the number of parts required for work completion, it is checked whether the scanning of the parts is performed so as to match (i.e., be equal in quantity to) the number of parts required for work completion. When the scanning of the parts is completed, the parts scanning operation is terminated, and otherwise, the scanning of the parts is performed again in S120 through S110.

In this way, when the scanning of the parts and the number of parts required for work completion match in S163 and S164, the operation of the home position adjustment part 144 is controlled by the above-described information of the home position sensor 143 to instruct home position seating work (S165), so that the parts are seated in the home position (S166).

Thereafter, as the checking result by the home position sensor 143, when it is recognized that the parts seated in the seating part 142 equal the number of parts required for work completion, the supplying of the parts is terminated. Otherwise, when it is recognized that the parts not seated in the seating part 142 equal the number of parts required for work completion, a supply operation is instructed for unconfirmed parts (S168), so that the supply operation is performed again in S110.

In accordance with a vehicle parts supply system and supply method of the present disclosure, without need for a worker to look at and select one or more parts directly and manually and to move the selected parts one by one from a loading container to a vehicle and perform work, by automatically supplying parts meeting specifications of a vehicle according to a required number of parts, it can be more advantageous in terms of efficiency and safety of work.

As described above, according to the present disclosure, by automatically arranging and supplying parts meeting specifications according to a required quantity from a loading container loaded with a large amount of parts such as plugs, it is possible to improve safety and workability of a worker.

While the present disclosure has been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. A vehicle parts supply system, comprising:
    a parts loading device in which a plurality of parts is loaded;
    a scanning device configured to scan the plurality of parts loaded in the parts loading device;
    a controller configured to select one or more parts having a specification suitable for a manufacturing target vehicle among the plurality of parts loaded in the parts loading device from a scanned image by the scanning device; and
    a transfer device configured to move and align the parts selected by the controller from the parts loading device to a parts alignment device,
    wherein the controller generates path information for picking the parts selected according to priority among the one or more parts having specifications suitable for the manufacturing target vehicle selected by the controller using the scanned image and controls an operation of the pick and place device according to the path information.

2. The vehicle parts supply system of claim 1, wherein the transfer device is a pick and place device.

3. The vehicle parts supply system of claim 1, wherein the controller selects the parts meeting the specification suitable for the manufacturing target vehicle through deep learning of the scanned image.

4. The vehicle parts supply system of claim 1, wherein the controller selects the parts having the specification suitable for a position where the parts are coupled to the manufacturing target vehicle.

5. The vehicle parts supply system of claim 1, wherein:
    the controller selects the parts according to the priority; and
    the controller selects a target having a smallest angle between one surface of the parts and a bottom surface of the loading device.

6. The vehicle parts supply system of claim 1, wherein the parts loading device includes:
    a loading container;
    a plate which divides an internal space of the loading container into an upper space and a lower space and in which a plurality of holes are formed; and a plurality of pins disposed in the lower space divided by the plate and configured to be raised by a pin driver and perform a protruding operation into the upper space through the plurality of holes.

7. The vehicle parts supply system of claim 6, wherein the controller controls the plurality of the pins to perform the protruding operation into the upper space by the pin driver, thereby aligning the parts loaded in the upper space.

8. The vehicle parts supply system of claim 1, wherein the parts alignment device includes:
an alignment jig;
a plurality of seating parts which are formed on the alignment jig and on which the plurality of parts are seated;
a plurality of home position sensors configured to detect whether the plurality of parts are seated in home positions of each of the plurality of seating parts; and
a plurality of home position adjustment parts configured to align a plurality of parts that are not seated in the home positions of each of the plurality of seating parts, to the home positions.

9. The vehicle parts supply system of claim 8, wherein the alignment jig is disposed to be inclined with respect to a ground.

10. The vehicle parts supply system of claim 8, wherein the plurality of home position adjustment parts are disposed in an upper direction of the plurality of seating parts and are operated in a vertical direction of the alignment jig under control of the controller.

11. A vehicle manufacturing system comprising the vehicle parts supply system of claim 1.

12. A method of supplying vehicle parts, comprising:
receiving, by a controller, specifications of a plurality of parts suitable for a manufacturing target vehicle;
scanning, by a scanning device, a parts loading device loaded with the plurality of parts under control of a controller;
deep learning, by the controller, a scanned image of the scanning operation and identifying a plurality of parts having the specifications suitable for the manufacturing target vehicle among the plurality of parts loaded in the parts loading device;
selecting one or more parts among the plurality of parts having the specifications suitable for the manufacturing target vehicle according to priority among the one or more parts using the scanned image, and generating path information for picking the parts selected according to the priority; and
controlling, by the controller, an operation of a transfer device according to the path information and moving and aligning, by the transfer device, the selected parts from the parts loading device to a parts alignment device.

13. The method of claim 12, wherein, in the generating of the path information, the controller selects a target having the smallest angle between one surface of the parts and a bottom surface of the loading device.

14. The method of claim 12, wherein:
the parts loading device includes a loading container, a plate which divides an internal space of the loading container into an upper space and a lower space and in which a plurality of holes are formed, and a plurality of pins disposed in the lower space divided by the plate and configured to be raised by a pin driver and perform a protruding operation into the upper space through the plurality of holes; and
the method further includes, when the plurality of parts having the specifications suitable for the manufacturing target vehicle are not identified in the identifying operation, controlling the pin driver to perform a protruding operation of the plurality of pins into the upper space and aligning the plurality of parts loaded in the upper space.

15. The method of claim 12, further comprising:
after the generating of the path information, apart from the aligning operation, checking whether a number of the plurality of parts identified in the identifying of the plurality of parts having the specifications suitable for the manufacturing target vehicle matches a number of the plurality of parts of scanning completion determined in the receiving of the specifications of the plurality of parts,
wherein, when the number of the plurality of parts of scanning completion is not satisfied, the receiving of the specifications of the plurality of parts is re-performed.

16. The method of claim 12, further comprising:
after the aligning operation, checking whether the number of parts required for work completion in the aligning operation satisfies the number of the plurality of parts required for work completion determined in the receiving of the specifications of the plurality of parts,
wherein, when the number of the plurality of parts required for work completion is not satisfied, the aligning operation is re-performed.

17. The method of claim 16, wherein:
the parts alignment device includes an alignment jig, a plurality of seating parts which are formed on the alignment jig and on which the plurality of parts are seated, a plurality of home position sensors configured to detect whether the plurality of parts are seated in home positions of each of the plurality of seating parts, and a plurality of home position adjustment parts configured to align a plurality of parts that are not seated in the home positions of each of the plurality of seating parts, to the home positions; and
the method further includes, when the number of the plurality of parts required for work completion is satisfied as a result of the checking of whether the number of the plurality of parts required for work completion is satisfied, controlling an operation of the plurality of home position adjustment parts and seating the plurality of parts seated on the plurality of seating parts in home positions.

18. The method of claim 17, further comprising:
after the seating of the plurality of parts in the home positions, checking, by the plurality of home position sensors, whether the number of a plurality of parts satisfying the number of the plurality of parts required for work completion is recognized,
wherein, when the number of a plurality of parts satisfying the number of the plurality of parts required for work completion is not recognized, the method re-performs the receiving of the specifications of the plurality of parts.

19. A vehicle manufacturing process comprising the method of claim 12.

* * * * *